Sept. 8, 1931.     J. F. MULLANEY     1,822,365
CHECK VALVE
Filed Aug. 28, 1926
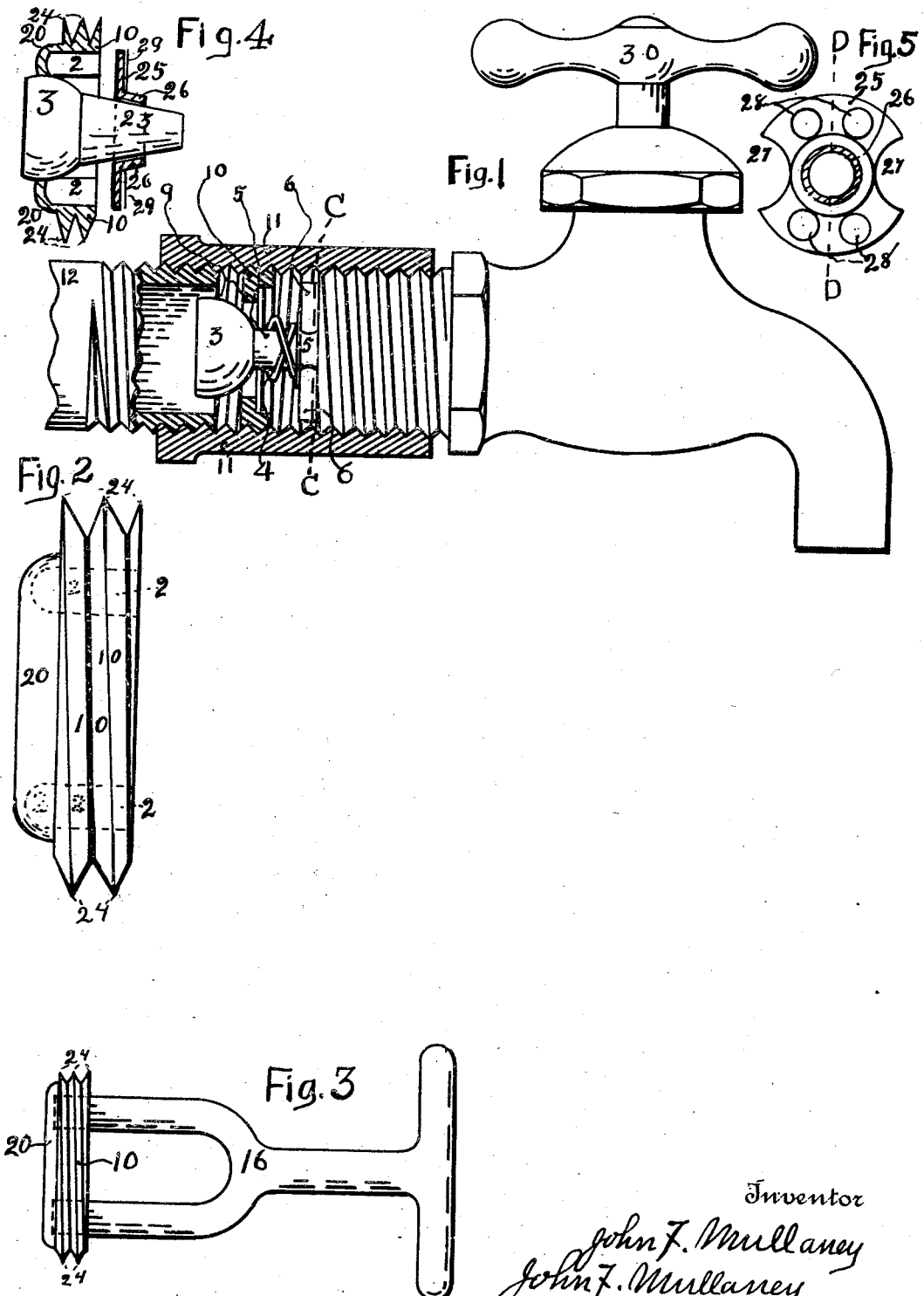

Patented Sept. 8, 1931

1,822,365

UNITED STATES PATENT OFFICE

JOHN F. MULLANEY, OF COLORADO SPRINGS, COLORADO

CHECK VALVE

Application filed August 28, 1926. Serial No. 132,064.

My invention relates to an improved, automatic-acting check valve adapted to be threadably entered into the outlet end of an already mounted tube or service pipe and without the need of a specially constructed coupling and before entering the faucet or stopper, as in a barrel, tank, hose coupling or faucet; and some of the objects of my invention, are, first, to supply a convenient check-valve to outlet-pipes for fluids to which faucets are to be attached and still leave room for inserting the faucet threadably against an abutment provided on the stem of the valve; second, to provide a valve that will shut off the flow of the water or other fluid, as air, automatically on removing the faucet or coupling; third, to provide a valve that will prevent the flow of a fluid from a barrel or other form of container while being rolled, though the outlet be not plugged otherwise; fourth, to provide a check-valve that will automatically stop the flow of fluid through the outlet of a pipe or container on the removal of the faucet or other coupled part, and automatically be forced open on the insertion of the faucet or other coupled part; fifth, to provide a check-valve that can be threadably inserted into the outlet end of the pipe or other container of fluids; sixth, to provide a check-valve that will prevent debris from entering a container while it is empty and will remain closed until some instrumental member is inserted into the outlet against the valve; seventh, to provide means on the valve seat to be engaged releasably by a pronged tool for inserting adjusting or removing the valve; eighth, to provide a check-valve in the end of a pipe or hose that will stop the flow of water or other fluid when the nozzle is removed; ninth, to provide a threadably secured valve-seat within an outlet tube and having extra-extending edges on the threads and of softer material than the female threads so that the soft male threads will be forced to conform to the form of the recesses and fill them to obstruct the flow of fluid; tenth, to provide a valve-seat member in the form of a ring with a reduced diameter on its back extension adapted to extend beyond the female threads of a tube and to receive in front the ends of a seating tool; eleventh, to provide a threadably adjusted valve-seat, adapted to use either a soft rubber valve or a metal valve automatically operated by either a spring or fluid pressure for its closing and opened by contact with the entered end of a faucet or other instrument.

I attain said objects, and others, by means of the mechanisms illustrated in the accompanying drawings, in which—

Figure 1 is a form of faucet shown inserted into an outlet of a water pipe shown part in section provided with said check valve; Fig. 2 is an edge elevation of the valve seat 10, on an exaggerated scale to show the abnormally extended threads 24; Fig. 3 is an edge elevation of the adjustable valve-seat ring and the prongs of a seating tool used for inserting and removing the ring; Fig. 4 is a sectional edge elevation of the entire valve in a similar form to that shown in a metal valve with a spring in Fig. 1, but omitting the spring 4 and showing the position of a filter member 29; and Fig. 5 is a face view of the skeleton abutment ring 25, of Fig. 4.

Similar designating numerals refer to similar parts throughout the several views.

The principles involved in this improvement are mostly illustrated in Figures 1, 2 and 4, in which are shown the valve seat 10, which is an adjustable valve-seat ring having abnormally projecting threads 24 and an extension 20 of the rear part of the ring with a reduced diameter and provided with a seat for the valve 3 carrying the valve stems 5 or 23 respectively in Figs. 1 and 4. The valve-seat ring 10 is to be constructed of softer material than the outlet pipe member 11 so that the elongated male threads 24, will be transformed to fit tightly the female threads into which they are forced so as to make an impervious joint, and yet to be so compact as to be insertable in the narrow space between the threaded end of a faucet 1 or of a similarly inserted member and the back end of the female threads, in the outlet pipe member, as shown at 11.

The recesses 2, shown in Figs. 2 and 4, are provided to receive the prongs of the turning or seating tool or wrench 16, shown in Fig. 3.

In Fig. 1, the valve mechanism, is shown forced open by the insertion of the faucet 1 against the cross pin 6 which passes through the valve stem 5 transversely and forces the valve 3 away from its seat 9 which allows the fluid to flow from the supply pipe 12 through the valve-seat ring 10 to the faucet 1. But should the faucet 1 be removed the spring 4, would close the valve 3 against its seat 9.

In Fig. 1 is illustrated a part of a section of an outlet for water or oil fitted with a metal valve and seat, and a metal spring 4, for the reason that metal is preferable to other material in contact with oils. Also it is required that there be a closing spring to hold the valve closed against its seat when the outlet is up, or at any time and condition wherein an inside pressure is removed from the fluid.

With the spring, a container may be rolled without leaking and may be mounted upon a pedestal before inserting the faucet and after being mounted a plug may be removed and the faucet inserted, which will open the valve for the fluid to enter the faucet, as would appear in Fig. 1 as the operating between the faucet and the valve. This valve needs a spring to prevent débris from entering empty barrels in transit, and for other purposes.

In Fig. 4 and Fig. 5 are shown the members of the valve most appropriate for moving fluids under internal pressure.

Water and air pressure supply pipes can be supplied by the automatic check valve illustrated in Figures 4 and 5, which illustrate a valve differing from that illustrated in Fig. 1; in the omission of a spring to actuate the valve, and relying upon the force of the compressed water or other fluid to close the valve.

The ball-shaped valve 3 is integral with the large tapering stem 23, in Fig. 4, and is inserted through the valve seat ring 10 so that the valve rests against the valve seat 9, after which the opening pressure disc 25 is slipped on over the end of the stem 23 with sufficient force to cause it to adhere to the tapering surface. This pressure disc 25 is preferably made of thin sheet metal with an annular flange 26 forming a large surface bearing on the tapering stem 23. This tapering stem 23 and the valve 3, are preferably made of rubber or other pliable material softer than the material of the said ring 10, and provided to cause the contact of the valve 3 against the seat 9 to be more nearly tight with slight pressure than it would likely be if both the seat and valve were composed of harder materials but other materials may be used.

The line 29, in Fig. 4, represents a filter member that may be placed over the pressure disc 25 for the purpose of obstructing the passage of débris to the faucet 1 when the faucet shown in Fig. 4 is used. The faucet presses against this strainer or filter member 29 and holds it in place against the outer face of the pressure disc 25, which has the outlets 27 and 28 for the passage of the fluid to the filter 29 and to the faucet 1. The removal of the faucet 1 for the cleaning of the filter will be by unscrewing the faucet 1, thus allowing the valve 3 to close against the valve seat 9, and thus stop the flow of the water or other fluid until a clean filter has been placed in lieu of the clogged one. The seating tool 16, shown in Fig. 3 is applicable to enter through the openings 27, in disc 25 without removing the same from the stem 23, though the disc 25 is easily removed or reseated while the valve 3 is in place and while held by the fluid pressure.

I am aware that the filter is no part of the invention of the check valve, but mention the applicability of this form of automatic check valve for receiving and holding a straining or filtering member and its convenient application to its use as set forth, between the valve and the faucet.

The figures are drawn to unusually large dimensions, and especially Fig. 2, and to show more clearly the peculiar construction; while the standard threads for pipe with half inch outlets are about 14 threads to the inch, and as my valve seat ring 10 has but two threads, it would occupy but 1/7 of the threads in an inch, and the rest of the appliance would project forwardly into the faucet or backwardly into the supply pipe, and for this purpose the diameter of the part 20, of 10 is reduced as shown in Figs. 2, 3, and 4.

One of the objects of having but two threads to the ring 10, is to enable the operator to insert it into the small space for it between the couplings of a water hose so that when a disconnection is made or a sprayer or nozzle is removed the check valve will prevent the flow until desired by introducing another member to carry the water. This is one of the useful applications for this valve.

In practical usage of a water faucet in domestic use the valve in the faucet 1 may be used from 10 times to 100, times a day, and so will wear so as to leak, and it will be required to remove the faucet 1 to repair the valve. In these cases, which may occur about once a year or oftener, the check valve will shut off the water when the faucet is being removed. As this occurrs so seldom, the check valve will last indefinitely longer than the rest of the plumbing.

The fact that débris gathers in domestic water sources makes the demand for a filter so common that this valve has a unique usefulness. The filter is bound to get clogged and must be frequently removed and replaced by a new one or be cleansed and reseated. This requires the removal of the faucet and thus the necessity of the check valve. The possible slight careening of the ball shaped valve 3, will not impair its checking of the flow, as the valve will always fit the seat. Also, the choosing of a softer material for the valve than that used in the seat will tend to insure a closer fit.

Where the room is ample between the faucet 1 and the ring 10, the form shown in Fig. 1, may be used with the pin 6, but where the space is too small for the pin 6, the disc 25 should be used instead. One of the unique and useful peculiarities of my automatic check valve, is that it can be inserted into the outlet end of a service pipe or supply pipe by simply removing the faucet and inserting this valve adjustably without any additional part or thimble and the faucet can be reinstated in the same relative position as formerly without any change in its construction or in the outward appearance of any part or fixture.

This check valve can be utilized by inserting it into a pipe coupling or other thimble as used in a hose coupling, or in a street elbow, as the part 20 has a reduced diameter, and the other projecting parts extend into the tubular openings of such connections.

Referring again to Figure 2, I wish to be understood to claim that the reduced diameter of the rearwardly projection 20, may be reduced or extended in projection and diameter to conform to the peculiar requirements. Also the abnormally extended threads, 24, in Fig. 2, are presumed to be made of soft material so that it will yield easily against the harder material of the thimble or pipe into which it is being screwed or forced. Also the said threads are necessarilly made thinner than to fit the sides of the valleys of the female threads so that the extra material on the extended edges will have a vacuity into which it can recede. The drawings show but two whole threads, but this may extend to many threads or be reduced to one. The object of having but few is to be able to leave threads enough in the outlet end of a pipe or hose to secure therein the faucet or the additional section of hose or pipe.

While it is obvious that this form of check valve can be used in any straight pipe as well as any other form of check valve, it is adapted to be used in all forms of new plumbing and can also be used in all forms of faucet fixtures by specially made forms and sizes. The common form shown in Fig. 4 can be inserted into most forms using a faucet without changing the fittings or the valve.

I therefore, having fully described my said check valve and its uses ask to have its improvements secured by the following claims.

1. An automatic check valve adapted to be inserted into the outlet of the fluid supply pipe of a common fluid fixture from its outer end, and comprising a ring-shaped member adjustably secured to the inner wall of the said supply pipe, a valve seat formed on the inner rear edge of said member, recesses provided in the inner edge of the outer face of said member and adapted to be engaged by a seating tool adapted to seat said member or adjust its position or remove it, a ball-shaped valve adapted to fit tightly into said valve seat and prevent the passage outwardly of fluid, a valve stem integral with said valve and projecting outwardly through said ring-shaped member, and a skeleton pressure disc secured to said stem and extending transversely thereof and parallel with the face of said ring-shaped member and about one fourth inch therefrom and adapted to be engaged by an inserted faucet to force said valve from said seat.

2. A check valve adapted to be inserted into the outlet of a container, and adapted to be closed by liquid compression and to be opened by the insertion of a threaded member, compressing and forcing said valve; and comprising, a metal ring secured adjustably to the inner surface of said pipe and having an annular valve seat formed on the inner rear edge of said ring, and having provided recesses in the face of said ring adapted to receive and engage a turning tool for seating or removing said ring, the material of said ring being slightly softer than the material of said outlet, the thin edge of the threads on said ring being slightly over extended and adapted to rub down, a ball-shaped valve adapted to fit closely against said seat, a valve stem extending forward from said valve through said ring, a pressure member secured to near the end of said stem and extending parallel to the face of said ring, in combination with a threaded tube, as a faucet, being inserted against said pressure member to open said valve.

3. A check valve of the class described comprising a screw threaded ring inserted into the outlet end of a service pipe and being of softer material than said pipe, the screw threads thereon being slightly extended at their thin edge, a valve seat formed in the rear inner edge of said ring, a ball-shaped valve of softer material than said ring, and fitted to press against said seat, a valve stem extending from said valve forwardly through said ring and having a tapered end, and a skeleton pressure member secured about near the end of said stem.

4. A check valve of the class described comprising in combination a screw threaded ring inserted into the end of a service pipe and being of softer material than the pipe, the male threads thereon being slightly extended at their thin edge, an integral backwardly-extending portion of less diameter than the threaded surface of said ring, a valve seat formed at the rear inner edge of said portion, and said ring having recesses provided in the face thereof adapted to receive the ends of a seating tool to turn said ring, a valve fitted against said seat and composed of softer material than said ring, a valve stem integral with said valve and extending forwardly from it through said ring, and having a tapering end formed on said stem, a skeleton pressure member secured about the tapered part of said stem near its end and parallel with said ring face and slightly distant therefrom, said valve being adapted to be closed by fluid pressure in said service pipe and to be opened by the threaded insertion of an outlet member, into said service pipe.

5. In a check valve of the character described the combination of a metal ring threadably and adjustably secured into the outlet end of a fluid service pipe or coupling and having recesses in its face adapted to receive a turning tool adapted to seat it and to remove it, and having a valve seat formed in its rear inner edge, a valve fitted against said seat and a valve stem extending from said valve forwardly through said ring, said ring being made of a metal softer than said pipe and a skeleton pressure member secured to said stem and extending parallel to the face of said ring.

JOHN F. MULLANEY.